Figure 1:
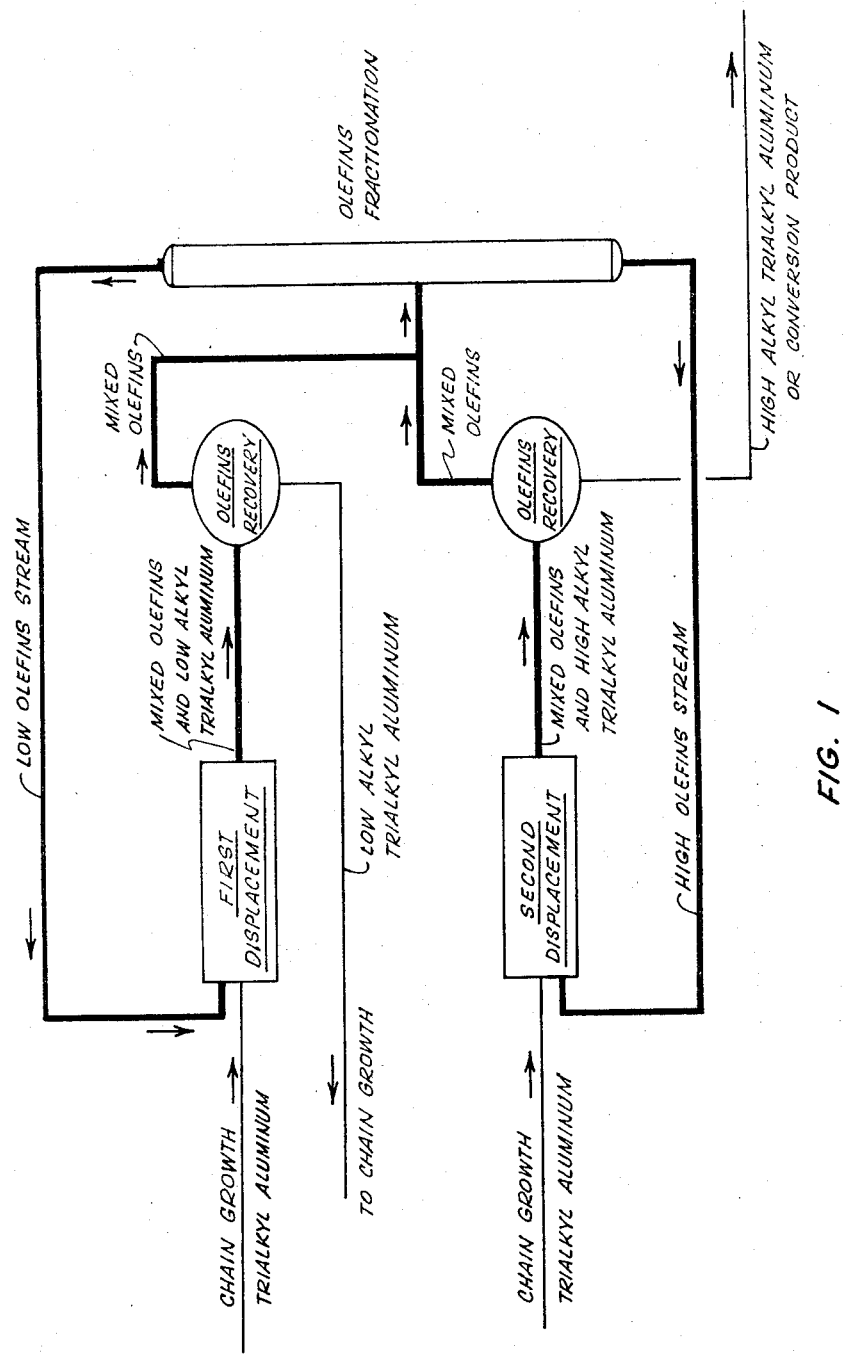

United States Patent Office 3,384,651
Patented May 21, 1968

3,384,651
PROCESS FOR PRODUCING TRIALKYL
ALUMINUM COMPOUNDS
Wayne T. Davis, Baton Rouge, La., assignor to Ethyl Corporation, New York, N.Y., a corporation of Virginia
Continuation-in-part of applications Ser. No. 234,339, Oct. 31, 1962, and Ser. No. 244,102, Dec. 12, 1962.
This application Sept. 26, 1963, Ser. No. 311,706
19 Claims. (Cl. 260—448)

This application is a continuation-in-part of my earlier applications, Ser. No. 234,339, filed Oct. 31, 1962, and now abandoned, and Ser. No. 244,102, filed Dec. 12, 1962, and now abandoned.

This invention relates to manufacture of trialkyl aluminum compounds. More particularly, the invention relates to a new process for the production of products or streams having higher alkyl groups therein, having controlled chain lengths, i.e., numbers of carbon atoms per alkyl group.

Of recent years, the production of trialkyl aluminum compounds has substantially increased, owing to improved processes wherein the trialkyl aluminum compounds can be readily generated from an olefin, aluminum, and hydrogen. Improvements have also been presented for the manufacture of trialkyl aluminum compounds from an alkyl chloride and aluminum metal. Triethyl aluminum is the outstanding trialkyl aluminum material, because it is readily generated from aluminum, hydrogen, and ethylene, as the net reactants. Such a process can be carried out in two separate stages, or can be carried out in one single reaction stage. Thus, see Patents 2,787,626 and 2,885,314. Tri-n-propyl aluminum and tri-butyl aluminum can similarly be efficiently manufactured.

Corresponding processes using higher normal alpha olefins are possible, but have not been widely used, partly because straight chain alpha olefins are much less available than the low molecular weight gaseous olefins, and also because considerable difficulty occurs with respect to isomerizing or dimerizing at reaction conditions.

The trialkyl aluminum compounds, particularly triethyl aluminum, can be readily converted to a mixture of higher alkyl trialkyl aluminum products by chain growth reaction. Such a reaction is disclosed by Ziegler et al. Patent 2,826,598. Thus, by reacting triethyl aluminum and a plurality of moles of ethylene, one can readily generate a mixture of trialkyl aluminum compounds including butyl, hexyl, octyl, etc. alkyl groups. It will be apparent that the individual alkyl groups vary by two carbon atoms as the adding unit is ethylene. When alkyl groups having an uneven number of carbon atoms are desired, the starting trialkyl aluminum material would then be a compound having an odd number of carbon atoms in the alkyl groups, for example, tri-n-propyl aluminum.

Despite the ability to carry out chain growth reactions, generally, chain growth has left much to be desired with respect to the specificity of the reaction. Thus, although it is possible to provide a chain growth product "peaking" in specific alkyl group ranges, it has not been possible to concurrently control the relative quantity of any alkyl groups. These deficiencies occur because, insofar as the chain growth reaction is concerned, every alkyl group present, in a reacting trialkyl aluminum mixture, is equivalent. Thus, the ethylene reacts indiscriminately, and a statistical addition is arrived at. Thus, when an average of five ethylene molecules for each ethyl group are reacted, the product trialkyl aluminum is not tridodecyl aluminum, but contains a mixture resultant from a statistical addition of ethylene to all aluminum alkyl bonds existing during the course of the reaction. Hence, the effluent from such a chain growth operation will include uncontrolled quantities of alkyl groups both lower than and higher than the dodecyl group. The foregoing weaknesses are particularly disadvantageous when it is desired to convert the trialkyl aluminum to an additional product, such as primary alcohols. Heretofore, then it has not been possible to efficiently convert a low alkyl trialkyl aluminum material to a high alkyl trialkyl aluminum product, with any real controllability as to product composition.

Not only is the prior art deficient in that chain grown trialkyl aluminum compounds can not be made with a good yield and a high degree of specificity, but it is extremely difficult to separate a trialkyl aluminum fraction from a chain growth mixture, having a statistical distribution of alkyl chain lengths, on the basis of the alkyl group length.

The object of the present invention is to provide a new and novel process for the conversion of lower alkyl aluminum materials and ethylene to high alkyl-trialkyl aluminum materials. An object of substantially all embodiments is to provide such an improved process wherein the net proportion of particular chain length ranges of alkyl groups of a trialkyl aluminum product is greatly increased. The object of specific utilizations of the invention which exhibit additional particular advantages is to combine the production of a trialkyl aluminum material, having said controlled alkyl groups, plus its conversion to a further product, specifically the normal primary alcohols corresponding to the alkyl groups.

In the following definition, description, and examples, the term "high alkyl-trialkyl aluminum" refers to trialkyl aluminum materials having alkyl groups having a desired range of number of carbon atoms. According to the necessities of any particular embodiment, it will be seen that the term can include, illustratively, streams predominating in 8 through 12 carbon atom alkyl groups. In other cases, and more frequently, the high alkyl streams predominate in alkyls of 12 through 18 carbon atoms. Further, dependent upon the requirements of any explicit embodiment, the product mixture can include alkyl radicals of a limited span or a wide span, and in varying proportions. In certain instances, the performance of an embodiment of the invention can be measured by the gross yield of alkyl groups of from 10 to 22 carbon atoms. In other cases, it will be desired to obtain a product having predominantly alkyl groups of from 12 to 16 carbon atoms. In extreme cases, the desired trialkyl aluminum product can consist essentially only of two, or even one, alkyl aluminum moiety. For example, the principles of the invention are fully applicable to generate a relatively high purity tri-dodecyl aluminum, or, for example, a stream consisting essentially of tetradecyl and hexadecyl aluminum moieties. The term "low alkyl-trialkyl aluminum material" refers to the feed materials and is also used with reference to intermediate streams, which are relatively high in alkyl groups of fewer carbon atoms than the desired products. The feed trialkyl aluminum used most frequently is triethyl aluminum. Diethyl aluminum hydride, which is readily converted in the presence of ethylene to triethyl aluminum is also frequently desirable. Other low alkyl-trialkyl aluminum materials such as tri-n-propyl aluminum, tri-n-butyl aluminum, or tri-n-hexyl aluminum are also readily suitable as feed materials. The term "alkyl aluminum moieties," sometimes used herein, refers to the fragment of a trialkyl aluminum molecular species having only one alkyl group, and is expressed as R$al$, wherein $al$ is one-third atom equivalent of aluminum.

It will be clear that the term trialkyl aluminum does not exclude materials readily convertible under process conditions to trialkyl aluminum compounds, thus alkyl aluminum hydrides will usually be present in the stream in small but detectable amounts. Similarly, the term trialkyl does not imply that the compounds present are necessarily those wherein all alkyls in a particular molecule are identical.

The term "low olefins," as used herein, refers generally to olefins, other than ethylene, predominating in olefins having fewer carbon atoms than the alkyl groups of the desired product. "High olefins" generally means olefins having carbon atoms equal in number to the desired product alkyl groups.

All forms of the present invention are characterized by the use of a "rotating" supply of olefins, viz., a more or less permanent inventory of olefins of various molecular weight ranges. This supply of olefins is separated, by fractionation, into two or more streams or reactant supplies, one relatively concentrated in high olefins and one relatively concentrated in low olefins, which are used in at least two displacement reactions. Displacement reactions involve the substitution of alkyl groups existing on alkyl aluminum feeds by new alkyl groups corresponding to the olefin reactants. In one of the displacement reactions, the concentrated low olefins stream is employed in reacting by displacement with a trialkyl aluminum chain growth product having a statistical distribution of alkyl groups, and produces thereby a trialkyl aluminum displacement product enriched in lower alkyl groups, and at the same time the olefins obtained from the displacement reaction are enriched in higher olefin compounds. In the second displacement reaction, the olefin stream concentrated in higher olefins is reacted with a trialkyl aluminum chain growth product, sometimes having a statistical distribution of alkyl groups, whereby a displacement product mixture is obtained including a mixture of trialkyl aluminum compounds enriched in alkyl groups of higher chain length, and a mixture of olefins, which are enriched in the lower olefin. The olefins released or discharged from both of the said displacement reactions are recovered and again fractionated into concentrated low olefin and concentrated high olefin streams. It will be seen that in all forms of the invention, a circulating supply of olefins is thus employed in the two displacement processes, and that fractionation operations can be limited exclusively to the mixtures of olefins in the effluents from the displacement reactions. As a result of the utilization of the above described general procedure, it is no longer necessary to attempt to segregate alkyl aluminum compounds according to the alkyl aluminum moieties, but nevertheless, a trialkyl aluminum product is derived wherein the identity, distribution and length of the alkyl groups is controlled virtually at will.

Generally, the moles of low olefins released in the one displacement reaction replace and equal the low olefins consumed (by forming alkyl groups) in a second displacement. There is, therefore, no necessity of replenishing the molar inventory of olefins except to compensate for losses in handling, and losses by purging of minor amounts of branched chain olefin by-products and olefins of higher chain length than desired for the alkyl groups.

A number of particular embodiments of the above defined invention are available and have particular individual benefits for specific situations.

One particular embodiment employs two chain growth operations. In said class of embodiments, a low alkyl-trialkyl aluminum feed, typically triethyl aluminum or the like, is subjected to chain growth. The resultant chain growth product is thereafter reacted with a low olefin displacing stream, whereby the trialkyl aluminum mixture in the displacement product is enriched or increased in concentration in the lower alkyl groups. At least a portion of said low-alkyl-trialkyl aluminum displacement product is then subjected to a second chain growth treatment with ethylene, producing a second chain growth product having an increased average length of alkyl groups. At least a portion of the second chain growth product is then subjected to displacement with a concentrated high olefin stream, whereby a trialkyl aluminum displacement product is obtained enriched in the higher alkyl groups.

The second above-mentioned trialkyl aluminum mixture is, in said class of embodiments, the desired product, and can be separated from the olefins accompanying the displacement product effluent for utilization as such in subsequent processing. Alternatively, as will be described hereinafter, intermediate treatment steps can be provided which further facilitate the overall objective of the process in making it possible to more efficiently separate the mixture of olefins accompanying the trialkyl aluminum mixture from the displacement process.

A significant benefit of the process is that the identity of the alkyl groups produced can be controlled. Further, the relative proportions can be controlled. Thus, for example, the relative proportions of dodecyl and tetradodecyl groups can be controlled. Additionally, when desired, it is entirely feasible to generate a product having twin peak concentration components not adjacent in chain length. Thus, for example, one can generate a trialkyl aluminum product wherein the major alkyl groups are octyl and dodecyl, with a much lower concentration of the decyl groups.

An additional class of embodiments agains involves a chain growth reaction processing a low alkyl, trialkyl aluminum fresh feed, but, in this class of operations, the fresh trialkyl aluminum feed is mixed and concurrently processed with, by chain growth, a low alkyl-trialkyl aluminum recycle stream. The chain growth product derived by this chain growth operation is then divided into two portions, termed A and B portions. These portions constitute the separate feeds to two displacement reaction steps, wherein, in the A displacement, a low olefins displacing stream is used in substantial excess, and wherein, in the B displacement reaction, the displacement olefin stream usually also in excess is concentrated in higher olefins. Again, the olefin mixtures derived from the above mentioned several displacement reactions are recovered from the effluents, and from these mixtures are again obtained fractionated streams including a stream concentrated in low olefins, for return to the A displacement, and a high olefins stream for feeding to the B displacement reaction step.

Yet another class of embodiments again involves the chain growth of a low alkyl-trialkyl aluminum fresh feed, and processing by displacement the resultant chain growth product with a higher olefins displacement stream to generate a high alkyl-trialkyl aluminum product. Concurrently, in a parallel system, a supply of trialkyl aluminum of relatively low alkyl group lengths, is subjected to chain growth with ethylene to produce a second chain growth product, which product is subjected to displacement by low olefins displacement mixture. As a consequence, an olefins mixture is derived enriched in higher olefins corresponding to displaced alkyl groups, and a low alkyl-trialkyl aluminum mixture is derived, which mixture is recycled, at least in part, to the mentioned second chain growth operation. The olefins from the displacement reaction are again recovered, and these, as well as the olefins from the first displacement reaction are fractionated to provide the desired high olefins and low olefins streams for the displacement reaction. In this class of embodiments, it will be seen that not only is a rotating or olefins inventory employed, but also the embodiment involves the circulation for processing purposes of an inventory of trialkyl aluminum components. In other words, trialkyl aluminum from the primary displacement is not fed to the second chain growth step or the second displacement step, except, if desired, to compensate for mechanical handling losses.

Figure 2:
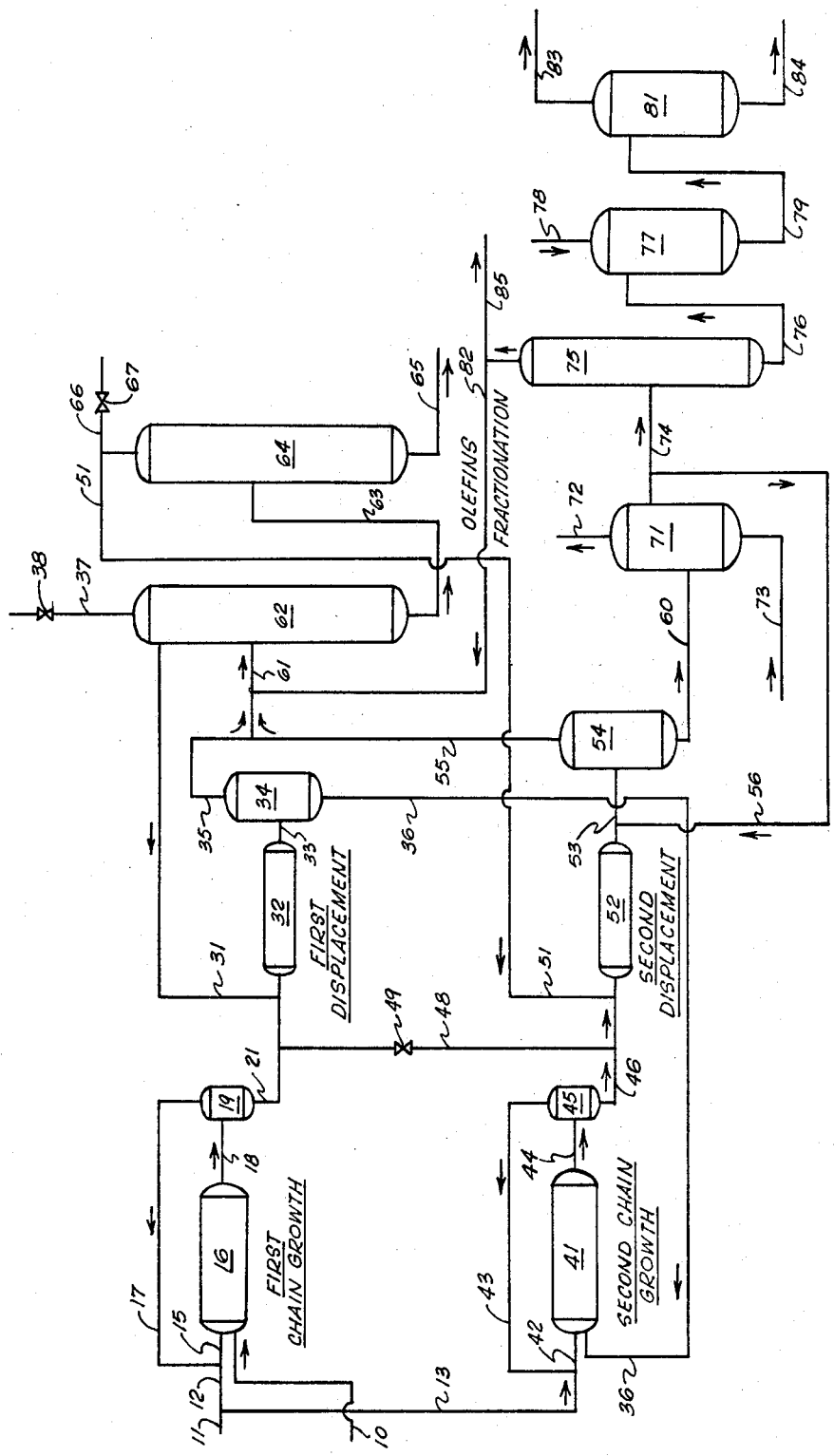
Figure 3:
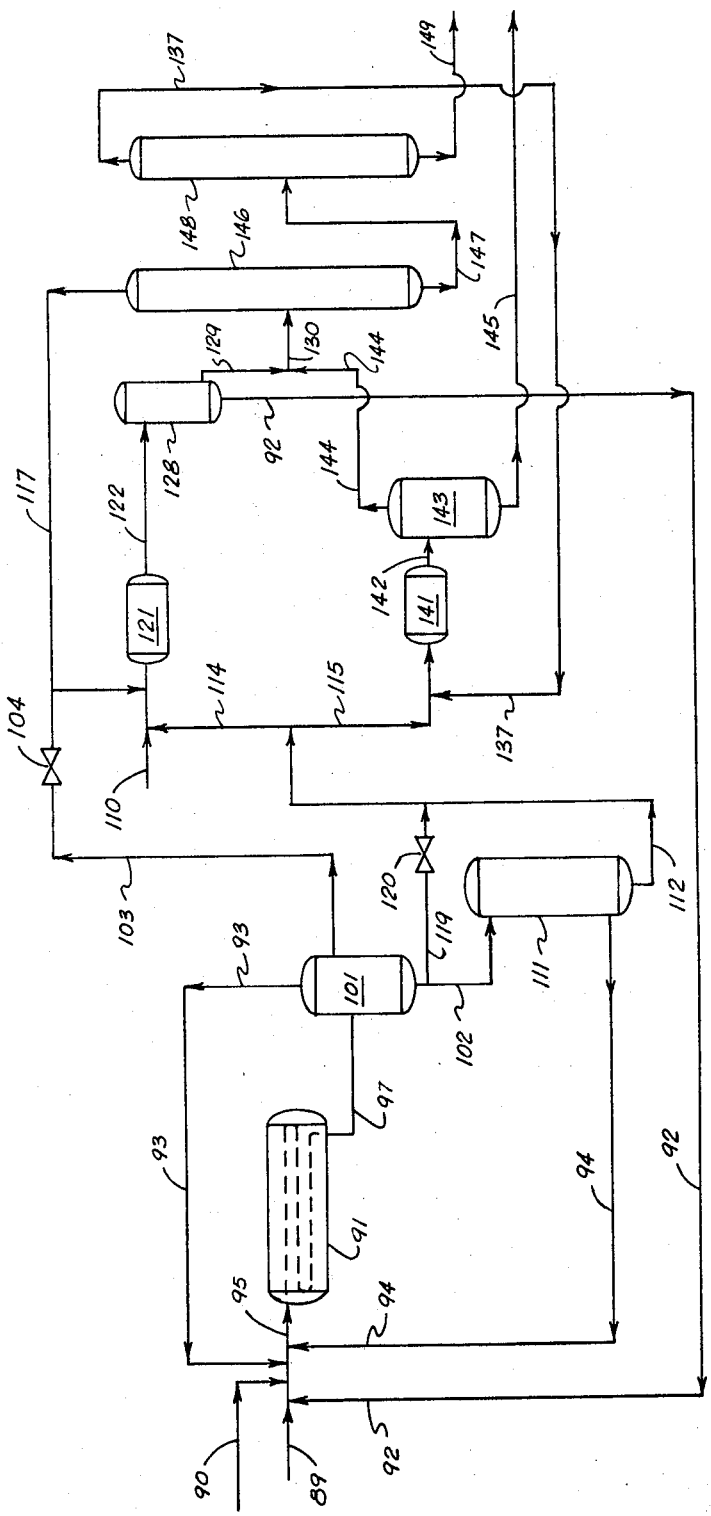
Figure 4:
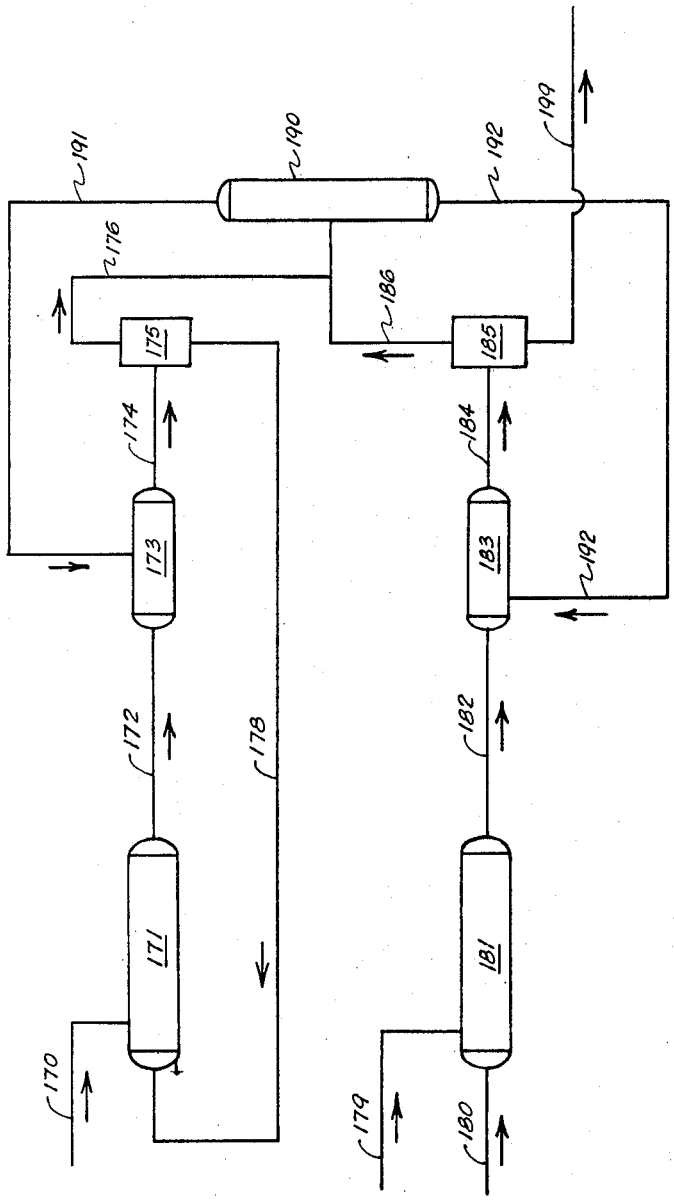

The details of carrying out the several embodiments of the process within the scope of the invention will be more readily understood from the following working examples, and from the figures, wherein FIG. 1 is a schematic representation illustrating in simplified form a general expression of the invention, FIG. 2 is a schematic flow sheet illustrating a particular embodiment of the invention utilizing two chain growth reactions, FIG. 3 is a flow sheet illustrating an additional embodiment wherein only one chain growth processing step is involved, and FIG. 4 is a schematic illustration representing a last embodiment employing a parallel trialkyl aluminum circulation loop as last generally mentioned above.

Referring firstly to FIG. 1, this is a simplified schematic representation showing interrelation of operations common to each embodiment of the process, wherein the heavy lines indicate the circulating olefins stream or inventory. As previously indicated, a relatively constant quantity of olefins, in terms of moles, is kept in circulation at all times. In practice, considering the overall results of the embodiments, ethylene is being selectively converted to a limited number of alkyl groups in a predicted and restricted chain length range, according to requirements of the process, and are discharged or utilized as aluminum alkyls for subsequent processing, or for separation as such. However, despite this migration, overall, of ethylene feed to alkyl groups of aluminum alkyl product, an olefin flywheel or loop is being utilized of approximately a constant number of moles. The particular quantity is of no consequence, with reference to the total inventory at any particular time, but, as the displacement operations employed utilize a substantial molal excess of olefins, the olefin inventory is usually relatively high compared to the trialkyl aluminum in process inventory.

Referring to FIG. 1, it is seen that a chain growth aluminum alkyl product, from a preceding chain growth operation, is fed to a first displacement operation, wherein it is subjected to the reaction of an olefin stream predominating in low molecular weight olefins. As a result of the displacement reaction, the effluent contains aluminum trialkyl aluminum materials enriched in the lower alkyl groups, whereas the olefin mixture discharged concurrently therewith is enriched in higher alkyl groups which have been displaced. Following the said first displacement, there is a separation operation wherein the olefins are recovered. An additional and second displacement operation is also fed by a chain growth product, viz., a trialkyl aluminum stream produced by the addition of a plurality of moles of ethylene to a trialkyl aluminum feed. Again, this feed material is subjected to a displacement operation, utilizing as reactant an olefins stream concentrated in the higher molecular weight olefin corresponding to desired alkyl groups. In both of the above mentioned displacement operations, the relative proportions of olefins to aluminum alkyls are relatively high, expressed in moles per mole of alkyl group present. In fact, the higher the ratio provided, the greater the opportunity for specificity and restriction of purity of the trialkyl aluminum present in the displacement reactor effluent. Again, as a result of the displacement reaction carried out in the second displacement reactor, a reactor effluent including high alkyl trialkyl aluminum components, and an olefin mixture somewhat enriched in the lower olefin components displaced, is engendered. The olefins are recovered in a recovery operation, and are then fractionated or divided into two fractions, either in parallel or concurrently with the olefin mixture from the first displacement effluent olefin recovery, thus producing a supply of low olefins and a supply of high olefins for circulating back to the displacement operations as already described.

In all embodiments of the invention, the olefins recovered are fractionated into low and high olefins streams. Normally, multi-plate distillation columns are used, but it will be understood that the term fractionate includes functionally equivalent modes of separating olefins according to molecular weight. For example, selective adsorption on solid high surface adsorbents could be employed, or crystallizing the higher olefin components.

The feeds to the displacement operations, as already indicated, include, in all instances, a chain growth trialkyl aluminum product. As will be evident from the preceding discussion of various classes of embodiments, and by the detailed illustrations hereinafter, said chain growth feeds can be the same in composition, or can be substantially different. In some cases, the trialkyl aluminum in one segment of the process will, as in the case of the olefins, be, in effect, a circulating medium for achieving a process objective.

As previously stated, FIG. 2 is a schematic illustration of a process utilizing the class of embodiments wherein two separate chain growth reactions are utilized in conjunction with the two displacements present in all forms of the invention. Referring to FIG. 2, an installation is shown also incorporating and utilizing, in unison with the basic process, supplemental reactions wherein the trialkyl aluminum product of specific characteristics is converted to a further product consisting of normal alcohols corresponding to the alkyl groups of the trialkyl aluminum materials. The major sections of the installation include a first chain growth section, a first displacement section with a first vaporizer portion, a second chain growth section and a second displacement section with olefin recovering apparatus associated therewith, and an olefin fractionation section. An alcohol manufacturing section is also shown. In this embodiment the olefin fractionation equipment is merged or combined for processing concurrently the several olefin streams, or part of the streams, released in the displacement operations. Ancillary apparatus such as condensers, pumps and valves are omitted from FIG. 2.

The ethylene supply to the plant is through line 11, which branches into two parts 12, 13, feeding the first chain growth section and the second chain growth section, respectively. A first chain growth reactor 16 is provided to receive ethylene through the feed manifold 15 which joins the branch ethylene feed line 12 and a recycle line 17. The net feed of low alkyl-trialkyl aluminum material is provided through feed line 10, connecting to the first chain growth reactor 16. The discharge line 18 from the first chain growth reactor passes to a knock-out drum 19. An overhead recycle line 17 is provided to transmit excess unreacted ethylene, a bottoms line 21 being provided for transfer of non-vaporized, predominantly trialkyl aluminum materials. The bottoms line 21 is joined by a first olefins line 31 and then passes to the first displacement reactor 32. Discharge line 33 from the first displacement reactor 32 connects to a vaporizer 34, having an overhead vapor line 35 and a bottoms line 36. The bottoms line 36 connects to the second chain growth reactor 41, which is also fed by an ethylene line 42, which in turn is essentially a manifold combining a recycle line 43 and the ethylene net feed line 13. An effluent line 44, from the second chain growth reactor 41, connects to a flash vessel or knock-out drum 45. A cross-over line 48, fitted with a control valve 49 is provided for "crossover" when necessary of some of the second chain growth product to feed to the first displacement reactor 32, or of the first chain growth product to the second displacement reactor. The bottoms line 46 from the knock-out drum 45 passes to the second displacement reactor 52, and is joined by a second olefins feed line 51. The effluent line 53 from the second displacement reactor 52 is joined by a recirculation line 56, which provides an oxidized alkyl aluminum stream from a subsequent oxidation section. The mixture passes through line 53 to an olefin vaporizing vessel 54, from which an overhead line 55 and a bottoms line 60 are provided for transfer of the respective streams. The overhead line 55 joins with the overhead line 35 from the first vaporizer 34, forming a mixed olefins line 61, passing to a first fractionator 62. A light overhead cut from said fractionator is transmitted by the first olefins line 31. An overhead line 37 is provided with a control valve 38 for purge of light olefins from the plant when desired. The bottoms line 63 from the first fractionator 62 passes to the second fractionator 64. The overhead line 51 from the second fractionator 64 is the second olefins line connected to the second displacement reactor 52, a branch or purge line 66 being provided, having a control valve 67. A bottoms line 65 from the second fractionator 64 discharges from the installation.

The bottoms line 60 from the second vaporizer 54 passes to oxidizer 71. An overhead line 72 is provided from the oxidizer, and feed line 73 is provided for a gaseous oxidizing agent such as oxygen or air. An oxidized stream discharge line 74 passes to an olefins column 75. An overhead line 82 from the olefins column 75 connects to feed line 61 to the first olefins fractionating column 62, for feed back of olefins, although in preferred embodiments the quantity of olefins separated is quite low, and a purge line 85 is more commonly employed. The bottoms line 76 connects to a hydrolyzing unit 77. A hydrolyzing liquid feed line 78 also feeds the hydrolyzer unit 77 and a discharge line 79 is connected to a final purification tower 81, from which an overhead product line 83 and a residue line 84 discharge.

The following working example is an embodiment directed to production of a trialkyl aluminum product stream concentrated in dodecyl through octadecyl aluminum moieties. Further, in this embodiment, the trialkyl aluminum production is integrated with the conversion to alcohol products.

Example 1

Triethyl aluminum is fed through line 10 to the first chain growth reactor 16 and ethylene is supplied through line 12, being joined by recycled ethylene provided through line 17 to the feed manifold 15. The net ethylene reacted in the first chain growth reactor is 13.5 moles per mole of triethyl aluminum fed, amounting to about four-fifths of the total ethylene reacted in the process. The effluent from the chain growth reactor, contains trialkyl aluminum components having the following alkyl aluminum mole distribution.

| Alkyl aluminum component: | Mole percent |
|---|---|
| Ethyl | 1 |
| Butyl | 5 |
| Hexyl | 11 |
| Octyl | 17 |
| Decyl | 19 |
| Dodecyl | 17 |
| Tetradecyl | 13 |
| Hexadecyl | 8 |
| Octadecyl | 4.6 |
| Eicosyl and higher | 4 |

Excess ethylene accompanying the foregoing trialkyl alumium product is flashed in the knock-out drum 19 and recycled through line 17. The trialkyl aluminum stream then is passed through line 21 to the first displacement reactor 32, being joined by the first olefin stream through line 31 in proportions of about 17 to 18 moles per mole of the trialkyl aluminum mixture. A typical composition of the first olefins stream is as follows.

| Olefin: | Mole percent |
|---|---|
| Butene | 9 |
| Hexene | 21 |
| Octene | 32 |
| Decene | 38 |

It is seen that the first olefin displacement stream consists essentially of olefins below a desired key alkyl group, dodecyl, in chain length. The stream may be accompanied by small proportions of other olefins. The olefins consist essentially of the normal alpha olefins, but minor quantities of vinylidene or internal olefin isomers will normally be present. In the reaction in the first displacement reactor, the trialkyl aluminum mixture is enriched in alkyl aluminum compounds having lower-than-desired alkyl groups, viz., alkyl groups of 10 or less carbon atoms. Thus, feed to the first displacement reactor contains about 47 mole percent of alkyl groups of 12 and higher carbon atoms, but the discharged trialkyl aluminum components from the first displacement reactor has this proportion drastically reduced to about 8 mole percent. Similarly, the displacement reaction then enriches the olefins, accompanying the trialkyl aluminum in the discharge mixture, in olefins of 12 and higher carbon atoms. The percentage concentration enrichment is by no means as perceptible owing to the use of a relatively high ratio of olefins to trialkyl aluminum feed to this reaction step. Thus, the olefins in the effluent from the first displacement reactor 32 have the following approximate composition.

| Olefin: | Mole percent |
|---|---|
| Butene | 9 |
| Hexene | 19 |
| Octene | 30 |
| Decene | 35 |
| Dodecene | 3 |
| Tetradecene | 2 |
| Hexadecene | 1 |
| Octadecene and higher | 0.7 |

The mixture from the first displacement reaction then passes to the separator 34 for vaporization of a large percent of the olefins, leaving as bottoms the trialkyl aluminum components accompanied by very minor amounts of the higher molecular weight olefins, over 90 percent of the olefins being separated and discharged through line 35. The bottoms are discharged through line 36 and provide a feed to the second chain growth reactor 41. Also introduced to the second chain growth reactor is ethylene in line 42, made up in part of fresh ethylene supplied by line 13 and recycled ethylene supplied through line 43. The net ethylene feed to the second chain growth reactor is in the proportions of about 3½ to 4 moles per mole of the trialkyl aluminum portion. The mixture generated by this chain growth reaction is appreciably enriched in the higher alkyl aluminum components, having the approximate following composition.

| Alkyl aluminum component: | Mole percent |
|---|---|
| Ethyl | 1 |
| Butyl | 3 |
| Hexyl | 8 |
| Octyl | 16 |
| Decyl | 23 |
| Dodecyl | 22 |
| Tetradecyl | 14 |
| Hexadecyl | 7 |
| Octadecyl | 3 |
| Eicosyl and higher | 2 |

The feed and the effluent to and from the second chain growth reactor 41 also includes minor proportions of higher olefins accompanying the trialkyl aluminum stream used as a reactant, these being the olefins not separated by the flashing operation in the vaporizing chamber 34. These olefins amount to only several mole percent based on the trialkyl aluminum and are predominantly 14 or more carbon atom olefins.

After flashing excess ethylene in the flash chamber 45 for recycle through line 43, the trialkyl aluminum mixture (with minor quantities of olefins) pass through line 46, being joined by the second olefins stream provided through line 51, and providing the feeds to the second displacement reactor 52. The second olefins stream is concentrated in higher molecular weight olefins corresponding in chain length to the alkyl groups of the desired product. Thus, the displacement olefins provided through line 51 contain about 96 mole percent olefins of 12 through 18 carbon atoms, these again being substantially all normal alpha olefins. These olefins, as in the case of the first displacement reaction are provided in appreciable excess relative to the trialkyl aluminum material, viz., in proportions of about 8 to 9 moles per mole of trialkyl aluminum.

The displacement reaction results in the conversion in high yield of lower-than-desired alkyl groups of the trialkyl aluminum mixture fed to the second displacement reaction, to alkyl groups in the desired product range. A typical effluent from the second displacement reactor 52, in line 53, on an olefin free basis, will exhibit the following composition:

| Alkyl aluminum component: | Mole percent |
|---|---|
| Ethyl | 2.0 |
| Butyl | 1.2 |
| Hexyl | 2.8 |
| Octyl | 4.9 |
| Decyl | 9.6 |
| Dodecyl | 35.5 |
| Tetradecyl | 23.6 |
| Hexadecyl | 13.2 |
| Octadecyl | 6.3 |
| Eicosyl et al. | 1.2 |

As already indicated, the effluent stream from the displacement operation is immediately mixed with a recycled oxidized trialkyl aluminum stream provided through line 56. It has been discovered that the return of such a stream, having a composition varying from alkyl aluminum dialkoxide to aluminum trialkoxide, results in a rapid interchange of alkoxide and alkyl groups along the several components. As a result, it is possible to provide overall, a mixture wherein the aluminum containing components are dialkyl aluminum alkoxide compounds. Thus, if the recycled oxidation stream provided through line 56 is aluminum trialkoxide, it is recycled in proportions such that sufficient alkoxide groups are provided to convert all the aluminum components present to at least a monoalkoxide. Instead of using an aluminum trialkoxide stream, the recycled liquid can be a mixture of alkyl aluminum dialkoxides. It will be understood that the distribution of the alkyl moieties in both the trialkyl aluminum effluent and the recycled oxidation stream, are essentially the same.

The said mixing has the effect of immediately quenching any side reactions which might occur as a result of the high temperatures provided in the displacement reactor 52. Further, the alkyl aluminum alkoxide mixture resultant from this treatment permits more drastic temperature conditions in vaporizing and recovering the olefins of the effluent. The mixture is passed to the olefin vaporizer 54. A large segment of the olefins is vaporized therein, typically about three-fifths, and pass through line 55 to the feed 61 to the first fractionator 62. The fractionating column 62, 64 provide the low and high olefins streams for the first and second displacement reactions respectively, through lines 31 and 51.

The mixture of alkyl aluminum alkoxide materials and higher olefins pass from the second flash operation in chamber 54 through transfer line 60 to the oxidizing section 71. An oxidizing gas is provided through line 73. Inerts, after the oxidation reaction are vented through line 72. The oxidizing operation converts the remaining alkyl aluminum moieties to the corresponding aluminum alkoxide so the overall approaches or approximates in composition aluminum trialkoxide. The column 75 discharges any olefins separated as an overhead stream through line 85, the aluminum trialkoxide being discharged as a bottoms through line 76, the bottoms passing to the hydrolysis reactor 77. In certain cases, only a partial recovery of olefins will be made in the vaporizer 54, and the aluminum components will be accompanied, through oxidation by a substantial portion of higher olefins. These are recovered in such instances, by column 75 and returned to column 62 through line 82.

The hydrolysis reactor is also fed through line 78 with an aqueous reactor such as dilute sulfuric acid and a reaction is therein conducted converting the aluminum trialkoxides to the corresponding alcohols and aluminum inorganic compounds, this being discharged as a slurry through line 79 to a separatory drum or column 81, wherein the alcohols are taken off overhead through line 83, as a relatively pure stream of mixed alcohols, leaving the aqueous phase of inorganic aluminum material for discharge through line 84. Alternatively, the column 81 can be used solely as a stratifying vessel, for settling out the aqueous phase.

The alcohol product obtained thereby will have the following approximate typical composition:

| Alchol component: | Weight percent |
|---|---|
| Ethanol | <1 |
| Butanol | <1 |
| Hexanol | 1.5 |
| Octanol | 3.5 |
| Decanol | 8 |
| Dodecanol | 34 |
| Tetradecanol | 26 |
| Hexadecanol | 16 |
| Octadecanol | 8.8 |
| Eicosanol | 1.9 |

The foregoing alcohol mixture is readily further fractionated into individual compounds, or selected mixtures.

Yields of the trialkyl aluminum products, or, as in this example, alcohols generated therefrom, are quite high, being somewhat higher on the trialkyl aluminum feed than on the ethylene feed. Minor amounts of losses occur as high molecular olefin residues, discharged through line 65, or as purge streams through pure lines 37, 66, 85. These discharge streams can dissipate vinylidene olefin or internal olefin streams which may build up owing to side reactions in the chain growth reactions or the displacement reactions.

The alcohol product obtained by the foregoing operation exhibits a gross content of about 85 percent in the dodecanol through octadecanol fraction, the weight ratio of the dodecanol to tetradecanol being about 1.3:1. A particular feature of the present invention is that the internal proportions of a trialkyl aluminum products alkyl group (or of alcohols made therefrom) can be altered without adverse effects. The following example illustrates one such variation, resulting in an increase in relative proportions of the 12 and 14 carbon atom alkyl groups, and a decrease in the relative amounts of the 16 and 18 carbon atom groups.

Example 2

Operations in this example are the same as in Example 1, except that a portion of slightly over ¼ the trialkyl aluminum mixture from the second chain growth reaction is transferred through the cross-over line 48, to form part of the feed to the first displacement reactor 32. The relative feeds of ethylene to the two chain growth reactions are also changed. Thus, the proportion of total ethylene reacted is reduced to about 65 percent in the first chain growth reaction. The ratios of the ethylene reacted in the first and second chain growth reactions are 11 and 4½ moles per mole of trialkyl aluminum processed.

The molal ratio of olefins to trialkyl aluminum to the displacement reactions are about 21–22/1, in the first displacement, and about 9/1 in the second, these ratios including small amounts of olefins accompanying the trialkyl aluminum portion.

As a result of these changes, the alcohol product stream obtained has the following composition:

| Alcohol: | Weight percent |
|---|---|
| Ethanol | 0.3 |
| Butanol | 0.4 |
| Hexanol | 1.4 |
| Octanol | 3.2 |
| Decanol | 6.7 |
| Dodecanol | 37.4 |
| Tetradecanol | 26.8 |
| Hexadecanol | 15.4 |
| Octadecanol | 6.3 |
| Eicosanol | 2.1 |

Comparison of the alcohol product obtained from Examples 1 and 2 show the flexibility associated with the process. The product from Example 2 has a weight ratio of dodecanol to tetradecanol of 1.4:1, compared with a corresponding ratio of 1.3:1 for the alcohols from Example 1. The proportions of alcohols in the preferred range, dodecanol through octadecanol, is slightly increased, from about 85 percent in Example 1 to about 86 percent in Example 2.

The benefits of the process are emphasized by comparison of the results which are obtained, as by the foregoing examples, with the results obtained from a conventional chain growth synthesis. Thus, a once-through reaction of triethyl aluminum with ethylene reacted in the same proportions as the total ethylene in Example 1 provides a trialkyl aluminum product of drastically different composition, as shown in the following table:

| Alkyl Aluminum Component | Alkyl Aluminum Concentration, Mole Percent | |
|---|---|---|
| | Conventional Chain Growth | Example 1 |
| Ethyl | 0.3 | 2.1 |
| Butyl | 1.9 | 1.2 |
| Hexyl | 5.4 | 2.8 |
| Octyl | 10.3 | 4.9 |
| Decyl | 14.7 | 9.6 |
| Dodecyl | 16.8 | 35.5 |
| Tetradecyl | 15.9 | 23.6 |
| Hexadecyl | 13.0 | 13.2 |
| Octadecyl | 9.3 | 6.3 |
| Eicosyl and higher | 12.3 | 1.2 |

The profound benefits according to the present process are readily apparent from the above. Thus, the total quantity of alkyl groups in the 12 through 16 carbon atom range is increased from 45 to 72 mole percent, an increase of about 60 percent. Considering specifically the dodecyl aluminum moiety, the yield of this alkyl group is increased over 100 percent.

To illustrate more fully the variation in product compositions which is now possible, the following table shows the product composition characteristics provided at various additional process conditions:

alkyls. Further, as demonstrated, the relative proportions of individual alkyls within the desired product range can be adjusted.

It will be noted that the trialkyl aluminum product stream will contain small but respectable portions of alkyl groups lower than the particulary preferred product range. These can be controlled or adjusted by varying the quantity of olefins to the displacement reactors, as shown by the preceding table. By building up the size of the second olefins stream, in Example 1, illustratively, to provide a ratio of about 18 moles per mole of trialkyl aluminum, the quantity of lower-than-dodecyl alkyl groups released by the second displacement reactor is reduced from about 17.6 to as low as 5 mole percent. An increase, or decrease, in the proportions of olefins fed to one displacement reaction must be accompanied by a corresponding change in the olefins and in the other displacement reactor. Generally, the quantity, in moles, of net olefins reacted in the two displacement reactors, must be approximately equal.

In the foregoing class of embodiments using two separate chain growth operations, the fraction of ethylene reacted in the first chain growth reaction is usually from one-fourth to nine-tenths, a preferred range being about one-half to about three-fourths. Where three-fourths is reacted in the first, about one-half of the final alkyl groups in the desired product range are generated in the first chain growth step. The mole proportion of olefins to aluminum alkyls is generally from 10–50:1 preferably 15–30:1.

The cross-over technique permits maintaining a constant olefin inventory regardless of desired product composition. Generally, the number of moles of higher olefins released in the first displacement must be equal to the number of moles of lower olefins released in the second displacement. Thus, as the desired dodecyl to tetradecyl ratio in the alkyl product is increased, the chain growing reaction must be terminated at a time when more lower alkyl groups still remain in the second chain growth product. Thus, more lower olefins are subsequently released in the second displacement reactor, requiring a greater release of higher olefins in the first displacement step. The cross-over of alkyl from the second chain growth to the first displacement provides higher alkyl groups for producing the required additional higher olefins.

The proportion of the second chain growth trialkyl aluminum diverted to the first displacement reaction, then, can be varied from zero to up to as high as about ¾ in some instances. A preferred range, in making alkyl aluminum groups of 12 through 18 carbon atoms, is from about ¹⁄₁₀ to ½, a preferred range being from about ⅕ to about ⅓.

In the foregoing examples, the low alkyl-trialkyl aluminum feed material has been uniformly illustrated as

| Chain Growth reaction, ethylene to R₃Al, mole ratio | | Second Chain growth product to first displacement, percent | Displacement Reactions minimum olefin: R₃Al, mole ratio | | Product R₃Al | | Alcohol product, dodecanol:tetradecanol. Wt. Ratio |
|---|---|---|---|---|---|---|---|
| First | Second | | First | Second | Mole percent, lower than Dodecyl | Mole percent, higher than Octadecyl | |
| 13.5 | 4.2 | 0 | 1.7 | 2.6 | 14.4 | 9.0 | 1.13 |
| 13.5 | 4.2 | 0 | 17.5 | 13.2 | 8.7 | 5.6 | 1.28 |
| 13.5 | 4.2 | 0 | 28.5 | 27.6 | 5.1 | 4.6 | 1.31 |
| 11.25 | 4.2 | 0 | 19.2 | 2.3 | 27.6 | 2.7 | 1.42 |
| 11.25 | 5.4 | 0 | 19.2 | 4.0 | 17.8 | 4.0 | 1.26 |
| 12.75 | 4.2 | 0 | 28.6 | 7.45 | 13.7 | 4.1 | 1.33 |
| 13.5 | 4.8 | 0 | 17.2 | 34.6 | 3.6 | 6.3 | 1.21 |
| 11.4 | 4.2 | 26 | 21.0 | 8.6 | 18.2 | 1.4 | 1.33 |
| 9.3 | 3.3 | 48 | 21.0 | 8.6 | 21.3 | 0.7 | 1.63 |
| 8.4 | 2.4 | 65 | 21.0 | 8.7 | 24.5 | 0.4 | 2.0 |

The foregoing table illustrates the variation in operating factors when the range of alkyl groups in the desired product is 12–18, inclusive and 10–16. When a different range is desired—for example, decyl to tetradecyl alkyl groups—similar relationships exist.

From the foregoing examples and data, it is seen that the present process permits production in high yield of product alkyl groups concentrated or peaking in desired triethyl aluminum. It will be understood, as previously discussed, that other low alkyl-trialkyl aluminum materials, or even mixtures can be substituted for this explicit feed material. The same results will be achieved, except that the streams in general will have alkyl groups increased in chain length corresponding on the average to the difference of chain length of the trialkyl aluminum feed and the triethyl aluminum specifically illustrated.

When mixtures are employed, the opportunity exists for developing products having alkyl groups separated by increments of one carbon atom instead of by two carbon atoms. Thus, when the feed trialkyl aluminum mixture contains equimolar proportions of alkyl groups of even and odd numbers of carbon atoms, then the several streams of the process will contain even and odd number components, resulting from addition to the starting components.

An additional particular class of embodiments are those in which the chain growth trialkyl aluminum stream is the same composition to each displacement reactor. A typical installation of such an embodiment is shown by FIG. 3. Referring to the figure, an ethylene feed 89 provides fresh ethylene, the low alkyl-trialkyl aluminum feed being in line 90. Recycle of excess ethylene and trialkyl aluminum streams are provided for by lines 92, 93, 94. Line 95 is a main feedline for the various components fed to reactor 91 through lines 89, 90, 92, 93 and 94.

A line 97 is for effluent from the chain growth reactor 91 and connects to a flash chamber section 101. In this embodiment a second flash chamber 111 is provided for a separation of a portion of the lower alkyl-trialkyl aluminum fraction from the spectrum of trialkyl compounds in the effluent from the chain growth reactor 91.

A by-pass line 103 is provided having a valve therein 104, whereby a portion of the olefin or light end stream separated in flash chamber 101 can be passed to a subsequent portion of the system. Normally this by-pass line 103 is not employed. An additional by-pass line 119 is provided, branching from the bottoms discharge line 102 from the flash chamber 101. This by-pass line is provided with a cut-off valve 120 which serves as a by-pass of second flash chamber 111.

A bottoms line 102 conducts the liquid phase from the first flash chamber 101 to the low pressure flash chamber 111. A liquid bottoms line 112 from the second flash chamber 111 passes the trialkyl aluminum material to subsequent operations. Branch lines 114, 115 are provided to transfer portions of the trialkyl aluminum mixture to the A displacement reactor 121 and the B displacement reactor 141, respectively. Line 110 is an input for blending additional or makeup olefins to displacement 121. Line 117 is provided to feed concurrently olefins to the A displacement reactor. The product stream from the A displacement reactor 121 is passed by a line 122 to a separation zone, having a vaporizer 128.

The trialkyl aluminum fraction fed by line 115 to displacement reactor 141 is reacted with olefins introduced by an olefin line 137, the effluent from the displacement reactor 141 passing through a discharge line 142.

The olefins separated from the products of the A and B displacement reactions are combined and fractionated to provide a low molecular weight olefin displacing stream and a high molecular weight olefin displacing stream. Thus, the effluent from the B displacement reactor 141 is passed through line 142 to a separator 143 operative at a low pressure and a temperature of about 240–250° F., from which a product line 145 conducts the desired trialkyl aluminum product, and an overhead olefins line 144 is provided to transfer the olefins separated therein. These olefin lines 129 and 144 then join at a feed line 130 to a first olefin fractionator 146. The overhead line 117 from this fractionator conducts low molecular weight olefins to the first or A displacement reactor 121. The bottoms from the first fractionator 146 are passed through a bottoms line 147 to a re-run or clean-up column 148. An overhead line 137 transmits olefins to the second or B displacement reactor 141, and a small amount of non-desired heavy end hydrocarbons are discharged through a line 149. The bottoms from 146 contain of the order of less than 1 mole percent of such heavies removed by column 148 through line 149.

EXAMPLE 3

In a typical operation of this installation, the process is conducted to provide trialkyl aluminum products having alkyl groups approximately corresponding to the mole distribution of molecular species found in a center cut of naturally derived lauryl alcohol. Specifically, a trialkyl aluminum product is to be obtained having a high concentration of dodecyl, tetradecyl, and hexadecyl alkyl groups, the molal ratio of the dodecyl to tetradecyl alkyl moieties being approximately 3.8:1, or at least in the range of 3.0–4:1. The molal ratio of 3.8:1 yields an alcohol product having a weight ratio of 3.3 parts of dodecyl alcohol per part of tetradecyl alcohol. The total weight of dodecyl to hexadecyl alcohols in the product is about 80 weight percent, the balance being lower molecular weight straight chain alcohols.

In this operation, a lower alkyl trialkyl aluminum mixture is fed by line 90 as the starting material, and fresh ethylene is provided through line 89. In addition, a low alkyl trialkyl aluminum stream is recycled through line 92, and excess ethylene is recycled through line 93.

To further define this operation, the following table shows typical stream compositions:

| | Trialkyl Aluminum Compositions, Mole Percent—Olefin Free Basis | | | | |
|---|---|---|---|---|---|
| Alkyl Aluminum Moiety | Trialkyl Aluminum to Chain Growth Reactor | | | Chain Growth Product (102) | Trialkyl Aluminum from "B" Displacement (142) |
| | Fresh | Primary Recycle (92)[2] | Secondary Recycle (94) | | |
| Ethyl | 22.3 | | 12.8 | 4.5 | |
| Butyl | 33.5 | 2.5 | 34.5 | 12.9 | 2.0 |
| Hexyl | 25.1 | 18.4 | 32.0 | 20.5 | 3.8 |
| Octyl | 12.6 | 36.8 | 15.2 | 24.7 | 7.6 |
| Decyl | [1]6.4 | 39.7 | 4.4 | 23.2 | 8.2 |
| Dodecyl | | 1.7 | [1]1.1 | 10.5 | 59.1 |
| Tetradecyl | | 0.5 | | 3.0 | 15.7 |
| Hexadecyl | | | | 0.6 | 3.6 |
| Octadecyl | | | | 0.1 | |

[1] Includes higher components.
[2] Trialkyl aluminum from "A" displacement.

As shown, the chain growth product mixture is subjected to two successive flashing operations 101 and 111 at successively lower pressures. The first operation can be in several stages with the terminal conditions being relatively low pressure of the order of about 10 mm. of mercury and about 185° F. The lowest pressure operation 111 separates some of the lower trialkyl aluminum components, particularly triethyl aluminum, as overhead for recycling to the chain growth reactor 91. The so-resultant bottoms stream of trialkyl aluminum components, discharged through line 112 then has a composition in which about 80 mole percent of the alklyl aluminum moieties are below 12 carbon atoms, 20–21 mole percent are 12 and more carbon atom alkyl aluminum moieties and higher. A disadvantage of the alternate transmittal, by line 119, to the displacement operations of a stream having appreciable quantities of triethyl aluminum therein is the fact that triethyl aluminum is quite refractory to displacement by higher olefins, in contrast to the susceptibility of butyl and higher groups to displacement by higher olefins as is employed in the B displacement reaction in reactor 141. In addition, triethyl aluminum is particularly difficult to separate from some of the olefins present in the mixture produced by the A displacement reaction, and will therefore appear in the olefin fractionation column 146. The presence of alkyl aluminum in the fractionator 146 will cause isomerization of the olefins from normal alpha olefins to internal and branched chain olefins.

In the above example, vaporizing separations are employed to separate olefins from the trialkyl aluminum components of the displacement reaction effluents, but other operations can also be provided at, usually somewhat greater expense. When vaporizing operations are employed, it is usually highly desirable to substitute a plurality of stages for the single stage separation illustrated. Thus, instead of a single stage vaporizer 128, an even more efficient separation is accomplished by a three stage flashing separation, the stages being operated at approximately one-half atmosphere, one-twentieth atmosphere, and the final being at the lower pressure of only several millimeters mercury absolute pressure.

Among the alternatives to the flashing type of separations described are solvent extraction, wherein a selective solvent is employed to separate the olefin components from the trialkyl aluminum components, or crystallization at low temperatures, whereby the trialkyl aluminum components are selectively frozen out of the mixture.

It is discovered that the process of the invention allows highly effective control of the net products of the chain growing reaction to correspond to the desired alkyl aluminum moiety distribution in the trialkyl aluminum product delivered by the process, and of course, corresponding to this, the desired composition of the products derived by stoichiometric reaction of the resultant trialkyl aluminum material. By the latter is meant the composition of alcohols or the composition of alpha olefins which can be readily derived from the trialkyl aluminum product, such as is delivered through line 149.

By composition of the product is meant not only the range of chain lengths of alkyl aluminum groups, but also of the internal ratio of key components within such a mixture. Thus, in cases wherein the trialkyl aluminum is to be converted to alcohols suitable as a replacement for alcohols desired from coconut oil, it is desired that the alcohols contain about 80–85 weight percent in the dodecanol-hexadecanol range. Further, the weight ratio of dodecanol to tetradecanol alcohols should be about 2.6:1 to 2.8:1. It will be understood, of course, that the foregoing proportions of these particular components is not an inflexible requirement of the process, but is illustrative of a typical embodiment. Under some circumstances, it well may be desired to produce a trialkyl aluminum mixture having a molal ratio of dodecyl to tetradecyl alkyl groups of from 3:1 to 4:1, or even below or above these ratios. In other cases, different bands of alkyl aluminum moieties can be desired, with a resultant change in the key component. Thus, one might wish to manufacture a trialkyl aluminum product predominating in the decyl aluminum to tetradecyl aluminum moieties and the principles of the process are equally applicable to such embodiments.

It is found that the proportions of a key component in the desired product band, expressed as a molal ratio to the next highest component, is in general accordance with an equation of the type $$(MA/MB) = S \times (C_1/C_2) + N$$

wherein $MA/MB$ is the weight ratio of the divided portions of the trialkyl aluminum mixture to the A and B displacement reactions, respectively,
$C_1/C_2$ is the desired weight ratio of the key alkyl aluminum moiety $C_1$, to the next moiety $C_2$, and
N and S are numerical constants.

The particular value of the constants will vary somewhat according to the identity of the key components $C_1$ and $C_2$ and the selection of certain operating conditions. In a class of embodiments wherein the key group is dodecyl aluminum $(C_{12}H_{25})al$, and the next largest alkyl aluminum moiety is tetradecyl aluminum $(C_{14}H_{29})al$, typical values are $S=1.56$ and $N=-2.12$. The resultant equation is then $$(MA/MB) = 1.56(C_{12}/C_{14}) - 2.12$$

Thus, for a weight ratio of about 3.25 parts dodecyl aluminum per part tetradecyl aluminum, the division of trialkyl aluminum streams to the A and B displacement reactors should be about 2.93:1. Expressed alternatively, about ¾ of the trialkyl aluminum mixture should be routed to the A displacement reaction at steady state operations to achieve the desired ratio.

It will be understood that the specific values for the constants of the foregoing relationship are not generally applicable in all possible embodiments of the invention, but are specific to the key component involved in the above working example. When other embodiments of the invention are performed which vary in appreciable degree as to certain of the process factors, the constants of the control equation will vary. Among the factors which can alter the precise value of the constants in the control equation are the composition of the fresh low alkyl-trialkyl aluminum feed provided to the chain growth reactor, the excess of olefins employed in the displacement reactors A and B and the spread and identity of alkyl aluminum components in the desired band. In any given example of this class of embodiments, the particular operating equation is readily determined and follows the foregoing general form. The constants will, generally be in the same order of magnitude when the relationship is expressed in terms of the mole ratio desired of the key component to the next higher component.

Of equal or even greater importance than the ratio of the key component to the next highest component, as discussed above, is the relative purity of the product in the desired alkyl aluminum band. In the working example, it will be noted that the product stream released through line 145 includes 78 mole percent dodecyl and higher alkyl aluminum moieties. When an appreciably higher concentration of dodecyl-and-higher alkyl aluminum moieties is desired in this stream, the excess of higher olefins provided to the B displacement reaction is increased. Thus, instead of a feed ratio of 7 moles of olefins per mole of trialkyl aluminum feed to the B displacement reactor 141, by doubling this ratio to about 14:1, the non-desired alkyl aluminum moieties will be reduced approximately one-third. Thus, a trialkyl aluminum stream having 85–86 percent dodecyl-hexadecyl alkyl aluminum moieties will be obtained, the lighter alkyl aluminum moieties being reduced to about 14 mole percent.

The identity of the fresh low alkyl trialkyl aluminum feed to the chain growth reaction of the process is important, but is not a critical limitation. Thus, instead of the feed employed in the foregoing working example, a relatively pure single trialkyl aluminum material can be provided such as triethyl aluminum, tri-n-butyl aluminum or tri-n-hexyl aluminum. When the alkyl groups are lower in carbon number than the average of the fresh feed illustrated, the control equation is shifted in the direction of a greater portion of trialkyl aluminum chain growth products being sent to the A displacement reaction, and the quantity of low alkyl-trialkyl aluminum components recycled to the chain growth step is similarly increased. Conversely, when the alkyl chain lengths of the fresh feed to the chain growth reactor are increased—for example, to tri-n-octyl aluminum, or an average of eight carbon atoms, a smaller proportion of the chain growth components will be sent to the A displacement reaction.

The fresh feed of lower alkyl-trialkyl aluminum component can contain alkyl groups having an odd number of carbon atoms. For example, the fresh feed can include tri-n-propyl aluminum, or tri-n-amyl aluminum. In such cases the process streams will include alkyl groups having adjacent alkyl groups, i.e., propyl, butyl, amyl, hexyl, etc., rather than alkyl groups varying by increments of two carbon atoms, as is the case when the fresh feed contains alkyl groups having only even numbers of carbon atoms.

In the working example, the preferred method was illustrated wherein olefins from both the A and B displacement operations are blended and then are fractionally distilled to isolate olefin streams for back feeding to the displacement operations. It will be apparent that such mixing before fractionation is not sacramental. Thus, separate olefin fractionation sections can be provided for the olefins developed in the A and B displacement reactions, and the fractions thus separately isolated can be blended to provide the feeds to the displacement reactions.

Similarly, side streams of olefins can be withdrawn from the olefin fractionation section or sections if needed as concurrent products. In such instances, steady state operation of the process will require replacement of the olefins thus removed with supplemental ethylene to the chain growth reaction, or make-up olefins to the A displacement reaction, or both.

Still an additional class of embodiments are those wherein two separate chain growth operations are provided, but one is used in conjunction with one of the displacement reactions employing a closed loop circulation of trialkyl aluminum components. A typical installation of such an embodiment is schematically illustrated in FIG. 4. Referring to FIG. 4, only the principal segments of an installation are shown, including a primary chain growth reactor 181, a secondary chain growth reactor 171, displacement reaction sections 173, 183, olefins recovery units 175, 185, and an olefin fractionation system 190.

In operations of this class of embodiments, fresh low alkyl-trialkyl aluminum is provided through line 180, along with an ethylene feed through line 179. The chain growth trialkyl aluminum product is passed through line 182, for treatment in the displacement reactor 183, by a substantial excess of high olefins provided through line 192. The effluent discharged through line 184 then includes olefins, altered in composition by enrichment in lower olefins, and high alkyl-trialkyl aluminum components of the desired composition. The olefin segment is substantially recovered in the recovery section 185, leaving a trialkyl aluminum product concentrate for transmittal through line 199. The olefins are passed through line 186 to an olefin fractionation section.

The secondary chain growth reactor 171 is fed a recycled low alkyl-trialkyl aluminum mixture through line 178 which is subjected to chain growth with ethylene provided through line 170. The effluent chain grown trialkyl aluminum is passed through line 172 to the second displacement reactor 173, wherein it is subjected to displacement by low olefins provided through line 191. The effluent mixture, including olefins substantially enriched in higher olefins as a result of a displacement, is passed to the recovery unit 175, which separates a substantial fractionation of the olefin components and transmits them through line 176 to the olefin fractionation section 190.

It will be understood that substantial auxiliary equipment for operation are required in an actual plant, including, illustratively, flash chambers for separation of excess ethylene and lower olefins for recycle to the chain growth operations, condensers, valves, etc. It is seen that in the foregoing class of embodiments, the combination of the secondary chain growth and secondary displacement operations utilizes a circulating supply of trialkyl aluminum materials which do not mingle with the trialkyl aluminum converted to product in the primary chain growth reactor 181 and the primary displacement reactor 183.

In a typical example of this class of embodiments, the feed to the primary chain growth reactor is triethyl aluminum and the high olefins stream provided for displacement in the primary displacement 183, is a stream concentrated in dodecene through octadecene normal alpha olefins. In the secondary chain growth reaction, the recirculated trialkyl aluminum provided through line 178 consists essentially of trialkyl aluminum compounds predominating in butyl through decyl groups, a typical mole percent distribution of the alkyls being

| | Mole percent |
|---|---|
| Butyl | 5.7 |
| Hexyl | 16.5 |
| Octyl | 31.1 |
| Decyl | 46.7 |

The details of operation of the chain growing reactions, employed in all embodiments of the process, are generally known in the art. For example, chain growth operations are described by Belgian Patents 597,315 and 553,721, and U.S. Patents 2,826,598 and 2,977,381. Generally, the operation of the chain growth reactors is carried out between about 90 to 150° C. at a pressure of 500 to 3,000 pounds per square inch. In preferred operations, as in Examples 1 and 2, the reactors are maintained at about 100 to 120° C. and at a pressure of about 1200 to 2,000 pounds per square inch. The residence time required varies according to the amount of ethylene to be reacted, but will usually be in the order of a fraction of an hour to twenty hours, a preferred range being 20 minutes to six hours or even 20 minutes to 2 hours. Frequently, an extended length tubular reactor is employed. It will be understood that the process is not limited to a specific chain growth reactor design. Thus, if more efficient, several individual reactors can be placed in series, or in parallel, for effecting one or both of the chain growth reactions. It is generally desirable to use ethylene in excess of about 25 to 100 percent of that required.

The displacement reactions are also known. Typical operating conditions are temperatures of about 270 to 330° C. with pressures of from about 100 to about 800 pounds per square inch, a preferred range being from 200 to 600 pounds per square inch, and even 400 to 600 lbs./sq. in. The second displacement reaction is desirably carried out at lower pressures being from 15 to 200 pounds per square inch, a preferred range being 15 to 100 pounds per square inch.

The details of a highly effective displacement reaction technique are shown in Belgian Patent 594,803 which is a solely thermal reaction. It will be appreciated that catalytic operations are effective and can be used, catalysts of the nickel type frequently being used. It will be appreciated, as previously illustrated, that the relative concentration of specific olefins is not greatly changed in the displacement reactions, owing to the usual use of a substantial excess of olefins. Further, as the trialkyl aluminum fed to each displacement operation is a chain growth mixture, only a portion of its alkyl groups will differ from the principal components of the olefin feed streams. Effluents from a high temperature displacement reaction step should usually be rapidly cooled sufficiently to terminate reaction.

The oxidation of trialkyl aluminum products, in those preferred embodiments of the operation which are integrated with the oxidation and hydrolysis, to provide an alcohol product, is also generally known in the art. Thus, the oxidation operation is described in Ziegler Patent 2,892,858, and in Patents 3,016,397 and 3,042,696. Generally, the preferred conditions employed are 50 to 70° C. and a total pressure of about 15 to 100 pounds per square inch.

The hydrolysis of aluminum alkoxides, formed in the oxidation step and separated from the olefins by the fractionator 75, in the most preferred embodiments, is also well understood in the art and is described in Ziegler Patent 2,892,858. The hydrolysis is preferably conducted with a dilute inorganic acidic solution at a temperature of about 80 to 120° C., although alkaline reactants in aqueous solution can be used.

Instead of a single flash zone operation following the displacement reactions, as shown in FIG. 2, FIG. 3, and FIG. 4, a two or three stage simple flashing operation at decreasing pressures is frequently desirable. Thus, instead of a single flashing operation in flash chamber 34 at about 110° C. and the low pressure of 10 millimeters mercury, it is frequently desirable to provide a three stage flashing operation at one atmosphere, one-sixth atmosphere, and about one-seventieth atmosphere.

Small quantities of alpha olefins are consumed to produce internal olefins and branched olefins during chain growth and displacement. Usually olefins produced as a by-product of the chain growing operation are sufficient in number to compensate for those lost to internals and branched chains. Internals and branched chain olefins are usually allowed to build-up in the circulating inventories of olefins until a small purge stream removes them from the system. Clean-up of the olefin circulating streams by separating the non-vinyl olefins is possible but is not usually economical.

The integration of an oxidation operation with the production of a specific trialkyl aluminum product, illustrated by Example 1, is feasible with other embodiments of the process. The oxidation operation need not be integrated precisely as shown in Example 1. Thus, referring again to FIG. 2, it is not essential to recycle oxidized alkyl aluminum material through line 56 to react with the trialkyl aluminum mixture. Instead the mixture can be cooled and passed to the vaporizer 54. In preferred cases of this variation, it is desirable to vaporize only a portion of olefins at this point, typically up to about 75 percent, thus increasing the quantity to be recovered in the subsequent tower 75. Surprisingly, even a substantial quantity of olefins in the oxidation step in the oxidizing section 71 do not enter into the reaction but are found to function essentially as inert diluents.

What I claim is:

1. A process for making a high alkyl trialkyl aluminum having alkyl groups controlled as to identity and proportions comprising
   (a) chain growing from about one-fourth to nine-tenths of the ethylene required to produce the desired high alkyl trialkyl aluminum compound on a low alkyl trialkyl aluminum and producing a trialkyl aluminum mixture having at least some alkyl groups in the desired product range,
   (b) reacting the trialkyl aluminum mixture from (a) with a first olefin stream predominating in olefins of lower chain length than the desired alkyl groups, forming thereby a displacement mixture including olefins enriched in higher olefins corresponding to the desired alkyl groups and a trialkyl aluminum mixture enriched in alkyl groups of lower chain length than desired,
   (c) recovering from the mixture from (b) a major portion of the olefins,
   (d) chain growing the rest of the ethylene required to produce the desired high alkyl trialkyl aluminum compound on the trialkyl aluminum components from (c), producing a trialkyl aluminum mixture enriched in alkyl groups in the desired product range,
   (e) converting a preponderance of the lower-than-desired alkyl groups in at least a part of the trialkyl aluminum mixture from (d) into alkyl groups of the desired product range by reacting with an excess of a second olefin stream concentrated in olefins having a chain length corresponding to the desired alkyl groups, forming thereby a mixture including olefins enriched in olefins of lower chain length than the desired alkyl groups and a trialkyl aluminum mixture concentrated in the desired alkyl groups,
   (f) recovering at least part of the olefins from (e) and
   (g) separating the first and second olefin streams from the olefins from (c) and (f).

2. A process for making a trialkyl aluminum product predominating in alkyl groups of 12 through 18 carbon atoms from triethyl aluminum and ethylene, comprising
   (a) chain growing from about one-half to three-fourths of the ethylene required to produce the desired high alkyl trialkyl aluminum compound on the triethyl aluminum and producing thereby a trialkyl aluminum mixture having at least some alkyl groups of 12 to 18 carbon atoms,
   (b) reacting in a first displacement reaction the trialkyl aluminum stream from (a) and a portion of a second chain grown trialkyl aluminum stream, as hereafter defined, with a first olefin stream predominating in olefins of less than 12 carbon atoms, forming thereby a displacement mixture including olefins enriched in higher olefins of 12 to 18 carbon atoms and a trialkyl aluminum mixture enriched in alkyl groups of less than 12 carbon atoms,
   (c) separating from the mixture from (b) a major portion of the olefins, and leaving a stream concentrated in the trialkyl aluminum mixture,
   (d) chain growing the rest of the ethylene required to produce the desired high alkyl trialkyl aluminum compound on the trialkyl aluminum of the stream from (c), producing a trialkyl aluminum mixture enriched in alkyl groups of 12 through 18 carbon atoms,
   (e) separating a portion of the trialkyl aluminum from (d) and feeding to the displacement reaction of (b), and reacting by displacement of the non-separated portion with an excess of a second olefin stream concentrated in olefins of 12 to 18 carbon atoms, forming thereby a mixture including olefins enriched in olefins of less than 12 carbon atoms, and a trialkyl aluminum mixture concentrated in alkyl groups of 12 through 18 carbon atoms,
   (f) recovering at least part of the olefins of the mixture formed in (e), and
   (g) fractionating the olefins from (c) and (f) into the said first and second olefin streams.

3. The process for production of a trialkyl aluminum product having alkyl groups controlled as to identity and proportions comprising
   (a) chain growing with ethylene on a mixture of fresh low alkyl-trialkyl aluminum components, and recycled low alkyl-trialkyl aluminum compounds as hereafter defined, and forming a chain growth product,
   (b) dividing at least part of the trialkyl aluminum compounds of the so-formed chain growth product into an A portion and a B portion,
   (c) reacting the A portion with an olefin stream predominating in lower olefins having less carbon atoms than the alkyl groups of the desired final product, and forming thereby an A displacement product mixture including lower alkyl trialkyl aluminum components and olefins enriched in higher olefins corresponding to higher alkyl groups in the A portion,
   (d) recovering at least part of the olefins of the A displacement product mixture of (c) and returning at least part of the lower alkyl-trialkyl aluminum components of the A displacement product mixture to the chain growing step (a),
   (e) reacting the B portion with a higher olefin stream as hereafter defined and forming thereby a B displacement product mixture including lower olefins and higher alkyl-trialkyl aluminum components,
   (f) recovering at least part of the olefins of the B displacement product mixture of (e) and
   (g) fractionating from the recovered olefins from (d) and (f) a low olefins stream for reacting in (c) and a high olefins stream for reacting in (e).

4. The process for the manufacture of trialkyl aluminum compounds having a preponderance of dodecyl through hexadecyl alkyl groups in controlled proportions comprising
   (a) reacting ethylene with fresh low alkyl-trialkyl aluminum components, and recycled low alkyl-trialkyl aluminum compounds and forming thereby a chain growth product,
   (b) separating and recycling unreacted ethylene and a portion of the lower alkyl trialkyl aluminum components in the said chain growth product,
   (c) dividing the trialkyl aluminum mixture left from the foregoing separation into an A portion and a B portion,
   (d) reacting the A portion with a molal excess of olefins predominating in olefins of less than twelve carbon atoms and producing thereby an A displacement product mixture of lower alkyl-trialkyl aluminum components and olefins enriched in higher olefins of twelve through sixteen carbon atoms,
   (e) recovering at least part of the olefins of the A displacement product mixture from (d), and returning at least part of the lower alkyl-trialkyl aluminum components of the A displacement product mixture to the chain growing step (a),
   (f) reacting the B portion with a molal excess of a higher olefin stream as hereafter defined and producing thereby a B displacement mixture including a product trialkyl aluminum mixture enriched in dodecyl through hexadecyl alkyl groups, and olefins enriched in lower olefins of less than twelve carbon atoms,
   (g) recovering at least part of the olefins of the B displacement mixture of (f),
   (h) fractionating from the recovered olefins from (e) and (g) a low olefin stream for reacting in (f), said high olefin stream predominating in olefins of twelve through sixteen carbon atoms,
   the ratio of the A and B portions of trialkyl aluminum being above an expression $$MA/MB = 1.56(C_{12}/C_{14}) - 2.12$$

wherein $MA/MB$ is the weight of the A portion to the B portion, and $C_{12}/C_{14}$ is the desired weight ratio of dodecyl to tetradecyl alkyl aluminum groups in the product trialkyl aluminum stream.

5. The process of making a trialkyl aluminum product having alkyl groups controlled as to identity and proportions, comprising
   (a) reacting by a first chain growth with ethylene a low alkyl-trialkyl aluminum feed and forming a chain growth trialkyl aluminum product,
   (b) reacting the chain growth product from (a) with a high olefin mixture forming thereby a trialkyl aluminum displacement product enriched in alkyl groups corresponding to said high olefins and an olefin mixture enriched in the olefins corresponding to the displaced alkyl groups,
   (c) reacting by a second chain growth with ethylene a low alkyl-trialkyl aluminum stream,
   (d) reacting the chain growth product from (c) with a low olefins mixture forming thereby a low alkyl-trialkyl aluminum displacement product enriched in alkyl groups corresponding to said low olefins, and an olefins mixture corresponding to displaced alkyl groups,
   (e) recovering at least part of the olefins from (b) and (d) and fractionating therefrom a high olefins stream and a low olefins stream for feeding to (b) and (d) respectively, and
   (f) recirculating the low alkyl trialkyl aluminum formed in (d) and (c).

6. In a method of making trialkyl aluminum from a low alkyl-trialkyl aluminum and ethylene, the method of producing a product with alkyl groups controlled as to identity and proportions, comprising fractionating a recirculated supply of olefins into a high olefin stream and a low olefin stream, and reacting said high and low olefin streams in excess in separate displacement reactions with trialkyl aluminum mixtures having some alkyl groups in the desired product range and some smaller, producing displacement mixtures, respectively, including
   a high alkyl-trialkyl aluminum product with a mixture of olefins enriched in lower olefins,
   a low alkyl-trialkyl aluminum mixture with a mixture of olefins enriched in higher olefins,
then recovering the olefin mixtures of the above defined displacement mixtures as the recirculated supply of olefins for fractionating into said high and low olefins streams, and reacting the low alkyl-trialkyl aluminum mixture with ethylene for further chain growth.

7. The process of claim 6 wherein at least a part of the chain growth product from the last named reacting step is fed to the displacement reaction which produces the high alkyl trialkyl aluminum product.

8. The process for making a high alkyl trialkyl aluminum product having alkyl groups controlled as to identity and proportions which comprises:
   (a) reacting by chain growth with ethylene trialkyl aluminum material relatively high in low alkyl groups, producing trialkyl aluminum first mixture;
   (b) reacting by chain growth with ethylene trialkyl aluminum second mixture at least part of which is trialkyl aluminum fourth mixture from step (d) below, producing trialkyl aluminum third mixture;
   (c) reacting by a first displacement at least a part of at least one of said first and third mixtures with low first olefins producing:
      (1) second olefins enriched in olefins corresponding to displaced alkyl groups, and
      (2) trialkyl aluminum fourth mixture enriched in alkyl groups corresponding to said low olefins;
   (d) delivering at least a part of said fourth mixture to step (b) to provide at least part of said second mixture;
   (e) reacting by a second displacement at least part of at least one of said first and third mixtures with high third olefins producing:
      (1) fourth olefins enriched in olefins corresponding to displaced alkyl groups, and
      (2) trialkyl aluminum fifth mixture enriched in alkyl groups corresponding to said high olefins; and
   (f) recovering at least part of the second and fourth olefins and fractionating to provide first and third olefins.

9. A process for producing high molecular weight materials of peaked product molecular weight range which comprises:
   (a) generating a wide range distributed aluminum alkyl first mixture having some alkyl components in the desired product alkyl range and some smaller;
   (b) subjecting a first part of said first mixture to displacement with first olefins having a higher percentage of corresponding components below said alkyl range than exist in said first mixture producing:
      (1) second olefins enriched on a percentage basis relative to the first olefins as to components corresponding to said alkyl range, and
      (2) an aluminum alkyl second mixture depleted as to components in said alkyl range relative to said first mixture;
   (c) recovering from at least part of the second olefins above third olefins whose corresponding components are concentrated in said alkyl range, at least a part of the balance of the second olefins providing a substantial portion of the first olefins;

(d) subjecting a second part of said first mixture to displacement with third olefins producing:
(1) fourth olefins depleted on a percentage basis relative to the third olefins as to components corresponding to said alkyl range and enriched as to corresponding components below said alkyl range, and
(2) a product aluminum alkyl third mixture concentrated as to alkyl groups in said alkyl range;
(e) delivering at least part of the fourth olefins as additional feed to the aforesaid recovering step (c); and
(f) subjecting at least a part of said second mixture to chain growth to provide additional aluminum alkyl material similar to said first mixture.

10. The process of claim 9 wherein substantially all the second mixture is subjected to chain growth (f) and substantially all the aluminum alkyl material of step (f) is added to said first mixture.

11. A process for producing high molecular weight materials of peaked product molecular weight range which comprises:
(a) subjecting to a first displacement a wide range distributed aluminum alkyl first mixture having some alkyl components in the desired product alkyl range and some smaller, said first displacement being with first olefins having a higher percentage of corresponding components below said alkyl range than exist in said first mixture producing:
(1) second olefins enriched on a percentage basis relative to the first olefins as to components corresponding to said alkyl range, and
(2) an aluminum alkyl second mixture depleted as to components in said alkyl range relative to said first mixture;
(b) recovering from at least part of the second olefins above third olefins whose corresponding components are concentrated in said alkyl range, at least a part of the balance of the second olefins providing a substantial portion of the first olefins;
(c) subjecting to a second displacement a wide range distributed aluminum alkyl third mixture having some alkyl components in said alkyl range and some smaller, said second displacement being with third olefins producing:
(1) fourth olefins depleted on a percentage basis relative to the third olefins as to components corresponding to said alkyl range and enriched as to corresponding components below said alkyl range, and
(2) a product aluminum alkyl fourth mixture concentrated as to alkyl groups in said alkyl range;
(d) delivering at least part of the fourth olefins as additional feed to the aforesaid recovering step (b); and
(e) subjecting at least a part of said second mixture to chain growth producing an aluminum alkyl fifth mixture at least a part of which is recycled to provide at least a part of at least one of said first and third mixtures.

12. The process of claim 11 wherein said first mixture and said third mixture are substantially identical.

13. The process of claim 11 wherein said first mixture and said third mixture are substantially identical and include substantially all the fifth mixture.

14. A process for producing aluminum alkyls having alkyl groups controlled as to identity and proportions which comprises:
(a) subjecting to a first displacement a wide range distributed aluminum alkyl first mixture having some alkyl components in the desired product alkyl range and some smaller, said displacement being with first olefins having a higher percentage of corresponding components below said alkyl range than exist in said first mixture producing:
(1) second olefins enriched on a percentage basis relative to the first olefins as to components corresponding to said alkyl range, and
(2) an aluminum alkyl second mixture depleted as to components in said alkyl range relative to said first mixture;
(b) subjecting at least a part of said second mixture to chain growth to increase the average size of the alkyl groups thereof producing an aluminum alkyl third mixture;
(c) subjecting at least a part of said third mixture to displacement with third olefins concentrated as to components corresponding to said alkyl range producing:
(1) fourth olefins depleted on a percentage basis relative to the third olefins as to components corresponding to said alkyl range and enriched as to components below said alkyl range; and
(2) a product aluminum alkyl fourth mixture concentrated as to alkyl groups in said alkyl range; and
(d) deriving components for the first and third olefins from at least one of the second and fourth olefins.

15. The process of claim 14 wherein a part of said third mixture is delivered to step (a) to constitute part of the material subjected to first displacement.

16. A process for producing aluminum alkyls having alkyl groups controlled as to identity and proportions which comprises:
(a) generating a wide range distributed aluminum alkyl first mixture containing some alkyl components in the desired product alkyl range and some smaller;
(b) subjecting at least a part of said first mixture to displacement with first olefins having a higher percentage of corresponding components below said alkyl range than exists in said first mixture producing:
(1) a second olefin mixture enriched on a percentage basis relative to the first olefin mixture as to components corresponding to said alkyl range, and
(2) an aluminum alkyl second mixture depleted of components in said alkyl range relative to said first mixture;
(c) subjecting at least a part of said second mixture to chain growth to increase the average size of the alkyl groups thereof producing an aluminum alkyl third mixture;
(d) subjecting at least a part of said third mixture to displacement with third olefins concentrated as to components corresponding to said alkyl range producing:
(1) fourth olefins depleted on a percentage basis relative to the third olefins as to components corresponding to said alkyl range and enriched as to components below said alkyl range; and
(2) a product aluminum alkyl fourth mixture concentrated as to components corresponding to said alkyl range; and
(e) deriving components for the first and third olefins from at least one of the second and fourth olefins.

17. The process of claim 12 wherein a part of the third mixture is delivered to step (b) to constitute part of the material subjected to first displacement.

18. A process for making aluminum alcoholates predominating in 12 to 18 carbon atoms, from triethyl aluminum, ethylene and an oxygen containing gas which process comprises:
(a) chain growing from about one-half to three-fourths of the ethylene required to produce the trialkyl aluminum fifth mixture of step (f) on triethyl aluminum producing thereby trialkyl aluminum first mixture having at least some alkyl groups of 12 to 18 carbon atoms;

(b) chain growing the rest of the ethylene required to produce the trialkyl aluminum fifth mixture of step (f) on trialkyl aluminum second mixture which is composed at least in part of trialkyl aluminum fourth mixture from (e) producing trialkyl aluminum third mixture enriched in alkyl groups of 12 to 18 carbon atoms;

(c) separating a portion of said third mixture and feeding to first displacement reaction (d) hereafter defined;

(d) reacting by a first displacement at least a part of said first mixture and the aforementioned separated portion of said third mixture with first olefins predominating in olefins of less than 12 carbon atoms producing:
 (1) second olefins enriched in higher olefins of 12 to 18 carbon atoms, and
 (2) trialkyl aluminum fourth mixture enriched in alkyl groups of less than 12 carbon atoms;

(e) separating at least a major portion of the second olefins and leaving a stream concentrated in said fourth mixture;

(f) reacting by a second displacement at least part of the non-separated portion of said third mixture from (c) with third olefins predominating in olefins of 12 to 18 carbon atoms producing a displacement mixture including:
 (1) fourth olefins enriched in olefins of lower chain length than the desired alkyl groups, and
 (2) trialkyl aluminum fifth mixture concentrated in alkyl groups of 12 to 18 carbon atoms;

(g) adding to at least part of the displacement mixture from (f) an oxygenated alkyl aluminum stream in proportions such that at least about one alkoxide group is provided per aluminum atom in the thus formed mixture;

(h) vaporizing from the mixture formed in (g) at least part of fourth olefins carried therewith and leaving a bottoms including aluminum compounds having total alkoxide groups equal to at least those in dialkyl aluminum alkoxide;

(i) oxidizing the said aluminum compounds in the bottoms of (h) with an oxygen containing gas and thereby converting substantially all the aluminum compounds to aluminum trialkoxides; and (j) fractionating olefins from at least one of the second olefins and fourth olefins to provide at least part of the first and third olefins.

19. A process for making aluminum alcoholate material predominating in 18 to 12 carbon atoms per alkoxy radical from triethyl aluminum, ethylene and an oxygen containing gas which process comprises:

(a), (b), (c), (d), (e), and (f) as defined in claim 18; and (g) separating from the displacement mixture from (f) only a part of the fourth olefins and leaving a mixture containing said fifth mixture and some fourth olefins in proportions of from about 20 to 80 weight percent olefins;

(h) oxidizing the trialkyl aluminum components of the mixture from (g) with an oxygen containing gas at least to a point where there are as many alkoxy groups present as there are aluminum atoms present producing a mixture of aluminum alkoxy alkyl materials and olefins;

(i) separating remaining fourth olefins from the mixture from (h);

(j) converting to alkoxy groups substantially all of the balance of the alkyl groups remaining in the materials from step (i) forming aluminum alcoholates; and (k) fractionating olefins from at least one of the second olefins from (e), the fourth olefins from (f), and the olefins from (i), to provide at least part of the first and third olefins.

References Cited

UNITED STATES PATENTS

| | | | |
|---|---|---|---|
| 3,053,905 | 9/1962 | Coyne et al. | 260—448 |
| 3,017,438 | 1/1962 | Atwood | 260—632 |
| 3,042,696 | 7/1962 | Aldridge | 260—448 |
| 3,066,162 | 11/1962 | Ziegler et al. | 260—448 |
| 3,087,954 | 4/1963 | McClaflin | 260—448 |
| 3,104,251 | 9/1963 | Foster et al. | 260—448 |

TOBIAS E. LEVOW, *Primary Examiner.*

H. M. S. SNEED, *Assistant Examiner.*

UNITED STATES PATENT OFFICE
CERTIFICATE OF CORRECTION

Patent No. 3,384,651                                  May 21, 1968

Wayne T. Davis

It is certified that error appears in the above identified patent and that said Letters Patent are hereby corrected as shown below:

Column 4, line 24, "agains" should read -- again --. Column 10, line 38, "pure" should read -- purge --. Columns 13 and 14, between lines 52 and 53, insert the table

| Olefin | Olefin Compositions, Mole Percent - Trialkyl Aluminum Free Basis | | | |
|---|---|---|---|---|
| | Low Olefin Stream (117) | Olefins in "A" Displacement Effluent (122) | Higher Olefins Stream (137) | Olefins in "B" Displacement (142) |
| Butene | 2.5 | 2.5 | ----- | 1.4 |
| Hexene | 19.0 | 18.4 | ----- | 1.4 |
| Octene | 37.5 | 36.5 | ----- | 7.0 |
| Decene | 40.5 | 39.5 | 6 | 17.7 |
| Dodecene | 0.5 | 2.2 | 70.0 | 53.8 |
| Tetradecene | ---- | 0.5 | 20.1 | 15.6 |
| Hexadecene | ---- | 0.1 | 3.9 | 3.0 |

Column 16, line 69, "growth" should read -- grown --. Column 24, line 66, claim reference numeral "12" should read -- 16 --. Column 26, line 7, "18 and 12" should read -- 12 and 18 --.

Signed and sealed this 18th day of November 1969.

(SEAL)
Attest:

EDWARD M. FLETCHER, JR.                        WILLIAM E. SCHUYLER, JR.
Attesting Officer                                Commissioner of Patents